Figure 1:
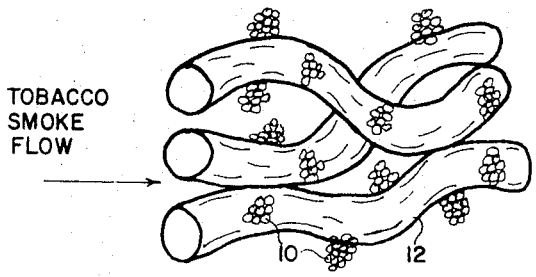
Figure 2:
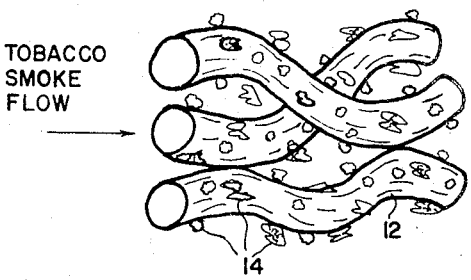
Figure 3:
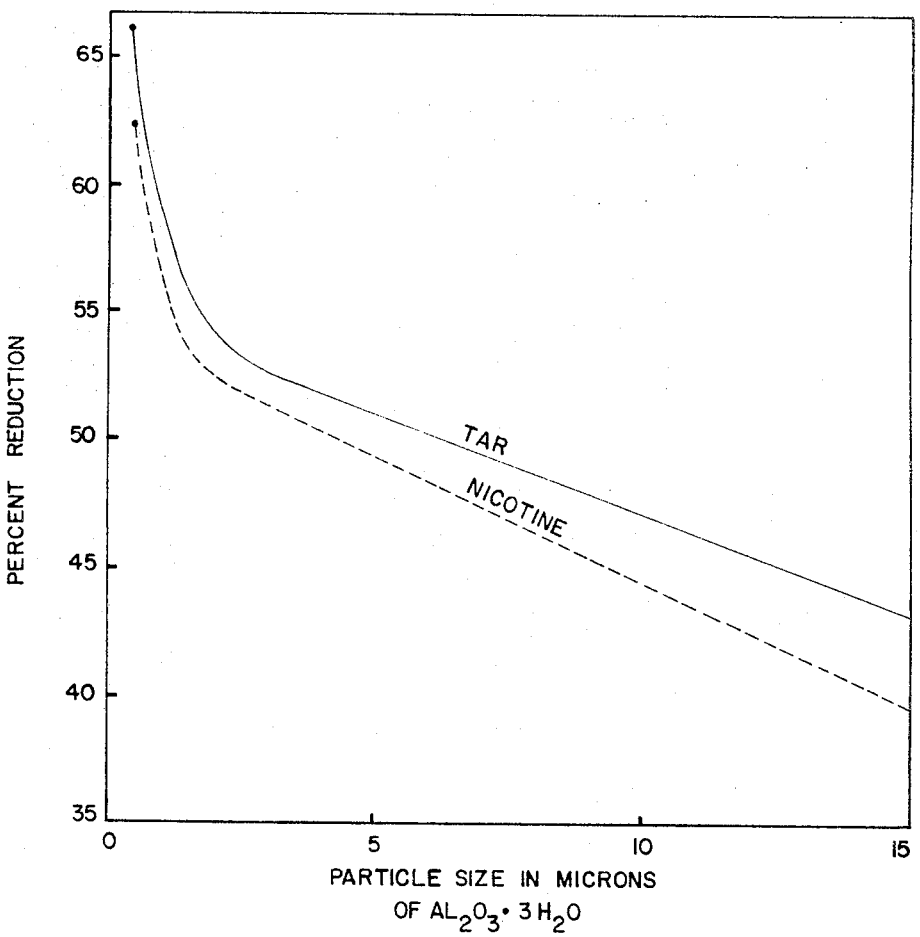

T863006

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JUNE 24, 1969

863 O.G. 1000

781,713

HIGH EFFICIENCY, ADDITIVE-TYPE TOBACCO SMOKE FILTER

George P. Touey and Cephas H. Sloan, both of P.O. Box 511, Kingsport, Tenn. 37662

Continuation of application Ser. No. 678,296, Oct. 26, 1967. This application Dec. 4, 1968. Published June 24, 1969

Int. Cl. A24f *7/04, 13/04;* B01d *27/00*

U.S. Cl. 131—266

1 Sheet Drawing. 26 Pages Specification

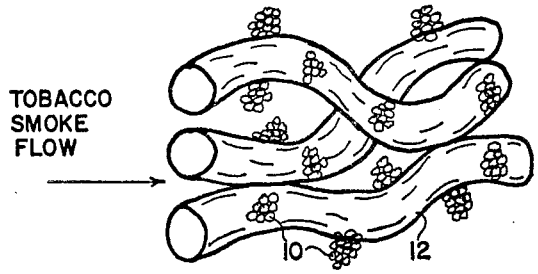

A tobacco smoke filter element containing alumina hydrate particles of less than about two microns in size for removing a high amount (up to about 70 percent) of the total particulate matter found in the effluent stream of tobacco smoke.

June 24, 1969 G. P. TOUEY ET AL DEF. PUB. T863006

HIGH EFFICIENCY, ADDITIVE-TYPE TOBACCO SMOKE FILTER SN - 781713

Original Filed Oct. 26, 1967

GEORGE P. TOUEY
CEPHAS H. SLOAN
*INVENTORS*

BY William T. French
Daniel B. Reece III
ATTORNEYS